United States Patent
Moyer

(10) Patent No.: US 7,565,514 B2
(45) Date of Patent: Jul. 21, 2009

(54) PARALLEL CONDITION CODE GENERATION FOR SIMD OPERATIONS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 105 days.

(21) Appl. No.: 11/413,255

(22) Filed: Apr. 28, 2006

(65) Prior Publication Data

US 2007/0255933 A1    Nov. 1, 2007

(51) Int. Cl.
G06F 9/00   (2006.01)
G06F 7/38   (2006.01)

(52) U.S. Cl. .......................... 712/223; 712/22; 712/220

(58) Field of Classification Search ................ 712/220, 712/223, 22
See application file for complete search history.

(56) References Cited

U.S. PATENT DOCUMENTS

| | | | |
|---|---|---|---|
| 5,838,984 A * | 11/1998 | Nguyen et al. .............. 712/5 |
| 6,006,316 A | 12/1999 | Dinkjian | |
| 6,192,384 B1 * | 2/2001 | Dally et al. ................ 708/200 |
| 6,530,015 B1 | 3/2003 | Wilson | |
| 6,738,522 B1 * | 5/2004 | Hsu et al. ................... 382/234 |
| 6,918,031 B2 | 7/2005 | Wilson | |
| 7,003,653 B2 * | 2/2006 | Spracklen ................... 712/300 |
| 7,366,873 B1 * | 4/2008 | Kohn ............................. 712/4 |
| 2003/0167460 A1 * | 9/2003 | Desai et al. ................. 717/151 |
| 2003/0191789 A1 | 10/2003 | Sheaffer | |
| 2004/0078549 A1 * | 4/2004 | Tanaka et al. ............... 712/22 |
| 2004/0230775 A1 | 11/2004 | Siegel et al. | |
| 2005/0027969 A1 | 2/2005 | Simon et al. | |
| 2005/0055534 A1 * | 3/2005 | Moyer ......................... 712/4 |
| 2005/0198478 A1 | 9/2005 | Wilson | |
| 2006/0212502 A1 * | 9/2006 | Chatterjee .................. 708/300 |

* cited by examiner

*Primary Examiner*—Eddie P Chan
*Assistant Examiner*—Idriss N Alrobaye
(74) *Attorney, Agent, or Firm*—Joanna G. Chiu; Robert L. King

(57) ABSTRACT

A processing system and method performs data processing operations in response to a single data processing instruction. At least two registers store data. First control circuitry compares data in respective corresponding fields of the at least two registers to create a plurality of condition values. Second control circuitry performs one or more predetermined logic operations on less than all of the plurality of condition values and on more than one condition value of the plurality of condition values to generate a condition code for each of the one or more predetermined logic operations. A condition code register stores the condition code for each of the one or more predetermined logic operations.

20 Claims, 3 Drawing Sheets

VECTOR_CMP.[ANY/ALL].[S/U].[CMP_TYPE].[ELEM_SIZE].[OTHER(S)]    rA, rB

VECTOR_CMP_SET.[ANY/ALL].[S/U].[CMP_TYPE].[ELEM_SIZE].[OTHER(S)]    rD, rA, rB ent invention relates generally to data processing
PARALLEL CONDITION CODE GENERATION FOR SIMD OPERATIONS

FIELD OF THE INVENTION

The present invention relates generally to data processing systems, and more specifically, to SIMD operations within data processing systems.

RELATED ART

Increased performance in data processing systems can be achieved by allowing parallel execution of operations on multiple elements of a vector. One type of processor available today which allows for this type of parallel execution is a single-instruction multiple-data (SIMD) processor (also referred to as a "short-vector machine") which allows for limited vector processing while using any existing general purpose register (GPR). For example, in a data processing system having 32 64-bit GPRs, each scalar register may be able to hold 2 32-bit elements, 4 16-bit elements, or 8 8-bit elements and thus able to perform 2 32-bit element operations, 4 16-bit operations, or 8 8-bit element operations. However, in current SIMD processors, limited information is provided regarding the relationship among groups of SIMD elements, thus placing limitations on software performance.

BRIEF DESCRIPTION OF THE DRAWINGS

The present invention is illustrated by way of example and not limited by the accompanying figures, in which like references indicate similar elements, and in which.

Figure 1:
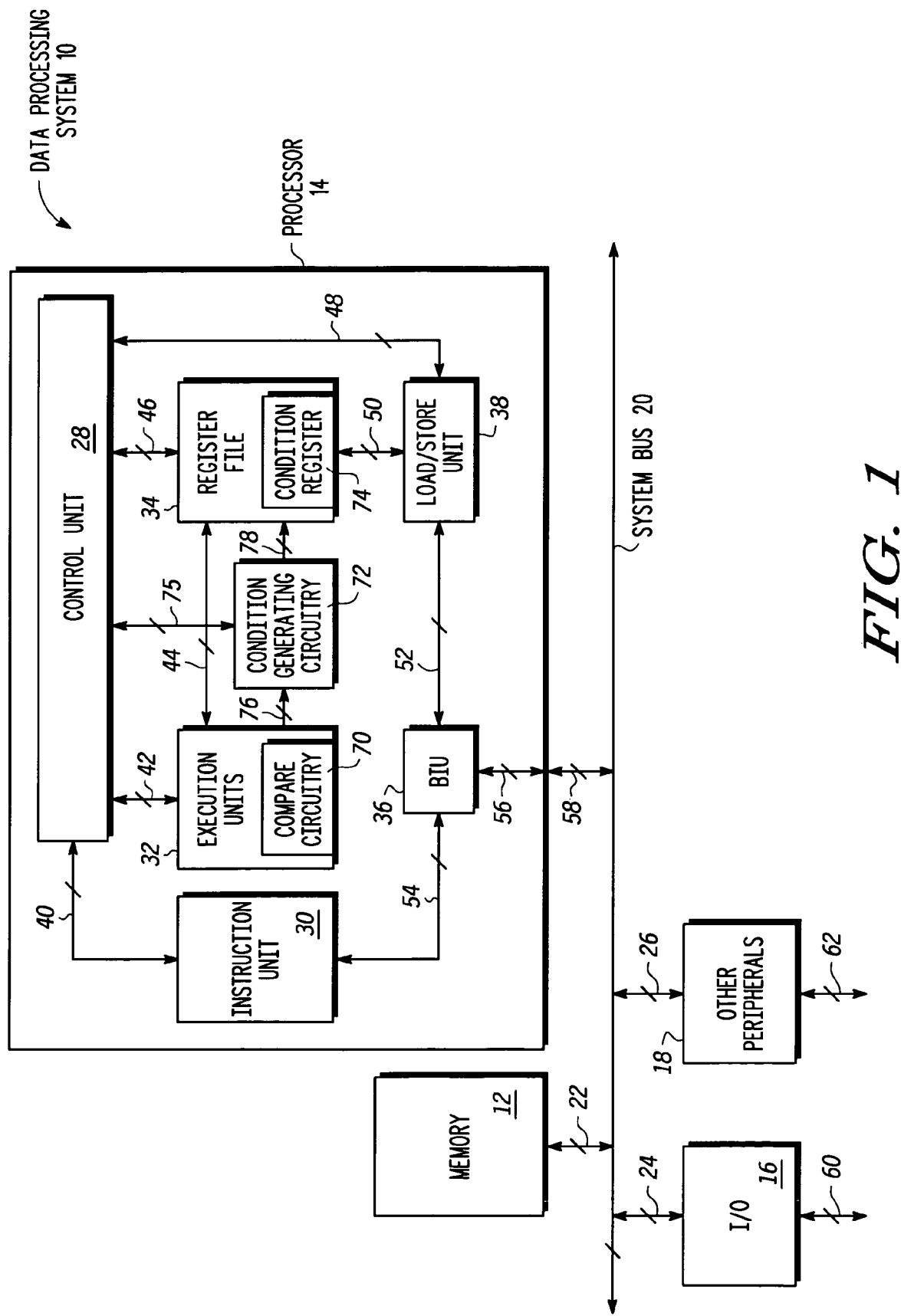
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As discussed above, in current SIMD processors, limited information is provided regarding the relationship among groups of SIMD elements, which places limitations on system software performance. Therefore, in accordance with an embodiment, SIMD processor instructions will be described herein which, for example, allow for parallel condition code generation for various vector element groupings, where each condition code generated reflects a set relationship of a corresponding vector element group. For example, a generated condition code may reflect the result of a predetermined logic operation performed on the corresponding vector element grouping. Furthermore, these condition codes are generated in parallel, in response to execution of a single processor instruction, where, for example, various fields of a condition code register can be updated with each generated condition code in response to the single processor instruction. In this manner, these condition codes may allow for improved software performance such as, for example, by allowing for faster binary searching or for faster pruning of a set of comparison operations.

In one embodiment, a processing system for performing data processing operations in response to a single data processing instruction includes at least two registers for storing data; first control circuitry, the first control circuitry comparing data in respective corresponding fields of the at least two registers to create a plurality of condition values; second control circuitry for receiving the plurality of condition values and performing one or more predetermined logic operations on less than all of the plurality of condition values and on more than one condition value of the plurality of condition values to generate a condition code for each of the one or more predetermined logic operations; a condition code register for storing the condition code for each of the one or more predetermined logic operations in response to at least one bit in the single data processing instruction.

In a further embodiment, the condition code register comprises a storage location for each of the one or more predetermined logic operations that is performed.

In another further embodiment, the at least two registers comprise two registers that receive data in response to execution of the single data processing instruction.

In another further embodiment, multiple logic operations are performed on less than all of the plurality of condition values substantially in parallel by implementing a binary grouping of the condition values wherein groups of condition values are formed having a number of condition values that is divisible by two and performing the one or more predetermined logic operations on at least a portion of groups within the binary grouping.

In another further embodiment, comparing of data performed by the first control circuitry is a determination whether data in each field of a first register is equal to data in a corresponding field of a second register.

In another further embodiment, comparing of data performed by the first control circuitry is a determination whether unsigned data in each field of a first register is less than unsigned data in a corresponding field of a second register.

In another further embodiment, comparing of data performed by the first control circuitry is a determination whether signed data in each field of a first register is less than signed data in a corresponding field of a second register.

In another embodiment, a method includes providing a processor for performing data processing operations; providing at least two registers for storing data; comparing data in a plurality of respective corresponding fields of the at least two registers to create a plurality of condition values; receiving the plurality of condition values and performing one or more predetermined logic operations on less than all of the plurality of condition values and on more than one condition value to generate a condition code for each of the one or more predetermined logic operations; and storing the condition code for each of the one or more predetermined logic operations in response to at least one bit in a single data processing instruction executed by the processor.

In a further embodiment, the method further includes performing one or more predetermined logic operations on less than all of the plurality of condition values substantially in parallel by implementing a binary grouping of the plurality of condition values and performing the one or more predetermined logic operations on the binary grouping.

In another further embodiment, the method further includes performing the one or more predetermined logic operations on less than all of the plurality of condition values substantially in parallel by forming groups of condition values having a number of condition values that is divisible by two; and performing the one or more predetermined logic operations on at least a portion of the groups of condition values.

In another further embodiment, the method further includes comparing data in the plurality of respective corresponding fields of the at least two registers by determining whether data in each field of a first of the at least two registers equals data in a corresponding field of a second of the at least two registers.

In another further embodiment, the method further includes comparing data in the plurality of respective corresponding fields of the at least two registers by determining whether unsigned data in each field of a first of the at least two registers is less than unsigned data in a corresponding field of a second of the at least two registers.

In another further embodiment, the method further includes comparing data in the plurality of respective corresponding fields of the at least two registers by determining whether signed data in each field of a first of the at least two registers is less than signed data in a corresponding field of a second of the at least two registers.

In another further embodiment, the method further includes storing the plurality of condition values in a third register.

In another embodiment, a processing system for performing data processing operations in response to a single data processing instruction includes a first register for storing data; a second register for storing data; compare circuitry coupled to the first register and the second register, the compare circuitry making a predetermined comparison to create a set of condition values; condition generation circuitry coupled to the compare circuitry for binarily grouping the set of condition values into predetermined groups each having a number of condition values that is divisible by two, the condition generation circuitry applying one or more predetermined logic operations substantially concurrently to each condition value of the predetermined groups to generate a condition code; and a condition code register coupled to the condition generation circuitry for storing the condition code.

In a further embodiment, the condition code register comprises a storage location corresponding to each of the predetermined groups.

In another further embodiment, the compare circuitry determines whether data in each field of the first register is equal to data in a corresponding field of the second register.

In another further embodiment, the compare circuitry determines whether unsigned data in each field of the first register is less than unsigned data in a corresponding field of the second register.

In another further embodiment, the compare circuitry determines whether signed data in each field of the first register is greater than signed data in a corresponding field of the second register.

In another further embodiment, the condition generation circuitry binarily groups the set of condition values into predetermined groups by having a first group and a second group with all of the condition values, a third and a fourth group each with half of the condition values, and a fifth, sixth, seventh and eighth group each with one-fourth of the condition values and eight logic operation results are provided to the condition code register.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

FIG. 1 illustrates, in block diagram form, a data processing system 10 capable of performing data processing operations in accordance with one embodiment of the present invention. Data processing system 10 includes a processor 14, memory 12, input/output (I/O) 16, other peripherals 18, and a system bus 20. Memory 12 is bidirectionally coupled to system bus 20 via conductors 22, I/O 16 is bidirectionally coupled to system bus 20 via conductors 24, other peripherals 18 is bidirectionally coupled to system bus 20 via conductors 26, and processor 14 is bidirectionally coupled to system bus 20 via conductors 58. In one embodiment, other peripherals 18 may include one or more peripherals, where each can be any type of peripheral, such as a universal asynchronous receiver transmitter (UART), a real time clock (RTC), a keyboard controller, other memories, etc. Some or all of other peripherals 18 may be capable of communicating information external to data processing system 10 via conductors 62. I/O circuitry 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include other elements than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core. In another embodiment, processor 14 may be one of many processors in a multi-processor data processing system. Furthermore, although not illustrated as such, processor 14 may be a pipelined processor. In the embodiment illustrated in FIG. 1, processor 14 includes a control unit 28, an instruction unit 30, execution units 32, a register file 34, a bus interface unit (BIU) 36, condition generating circuitry 72, and a load/store unit 38. Control unit 28 is bidirectionally coupled to instruction unit 30 via conductors 40, to execution units 32 via conductors 42, to register file 34 via conductors 46, to load/store unit 38 via conductors 48, and to condition generating circuitry 72 via conductors 75. Execution units 32 are bidirectionally coupled to register file 34 via conductors 44, and register file 34 is bidirectionally couple to load/store unit 38 via conductors 50. BIU 36 is bidirectionally coupled to instruction unit 30 via conductors 54 and to load/store unit 38 via conductors 52. Execution units 32 includes compare circuitry 70 which is coupled to condition generating circuitry 72 via conductors 76, and register file 34 includes condition register 74 which is coupled to condition generating circuitry 72 via conductors 78. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions (also referred to as processor instructions or data processing instructions) from a memory, such as memory 12, via BIU 36 and system bus 20, and receives and provides control information to and from control unit 28. Instruction unit 30 can be any type of instruction unit as known in the art, and operates as known in the art, and therefore will not be described in more detail herein. Instruction unit 30 therefore provides instructions to control unit 28 which controls execution of these received instructions via, for example, executions units 32 and load/store unit 38, which are both capable of communicating with register file 34, as needed, directly or via control unit 28. For example, control unit 28, via load/store unit 38 and BIU 36, is capable of loading data from memory (such as memory 12) to registers within register file 34 as needed for executing instructions and is capable of storing data from registers within register file 34 to memory (such as memory 12) as needed for executing instructions. For example, in one embodiment, load/store unit 38 can communicate directly with register file 34 (to read and write data) via conductors 50 based on control information provided from control unit 28 via conductors 48.

Register file 34 includes N general purpose registers (GPRs), where N can be any integer greater than or equal to one. In one embodiment, scalar register file 34 includes 32 64-bit registers. Each GPR in register file 34 may be referred to as a scalar register which refers to a register which has a one dimensional map and thus holds only one row of data (e.g. a 1 by M-bit register), where M can be any integer greater or equal to one. In one embodiment, M is 64, and each register is thus capable of storing a 64-bit quantity. Register file 34 can provide or receive control information or data to or from control unit 28 via conductors 46.

Execution units 32 can perform arithmetic, logical, shifting, or other operations using data stored within register file 34 and store results to registers within scalar register file 34, as required for executing the instructions received from instruction unit 30 by way of control unit 28. Execution units 32 may include, for example, arithmetic logic units (ALUs), floating point units, etc. In the illustrated embodiment, execution units 32 includes compare circuitry 70 which provides results of comparisons between elements (i.e. condition values) to condition generating circuitry 72. Compare circuitry 70 may include circuitry to perform relational operations, such as, for example, to determine whether an element is equal to, greater than, or less than another element. In one embodiment, compare circuitry 70 includes circuitry to perform relational operations on vector elements substantially in parallel. For example, in the case of a 64-bit vector having 8 8-bit elements, compare circuitry 70 can perform a relation operation on each of the 8-bit elements in one vector with respect to a corresponding 8-bit element of another vector all in parallel. For example, compare circuitry 70 can compare two vectors to determine whether each element of one vector is, for example, equal to, greater than, or less than a corresponding vector of another vector. Compare circuitry 70 may be implemented using known circuitry for performing different types of relational operations. For example, in one embodiment, compare circuitry 70 may be implemented using subtractors.

Condition generating circuitry 72 performs one or more predetermined logic operations (which may be performed substantially in parallel or substantially concurrently) on subsets of the condition values received from compare circuitry 70. For example, in the case of comparing two vectors each having 8 8-bit elements, 8 condition values are generated substantially in parallel by compare circuitry 70 to condition generating circuitry 72. Condition generating circuitry 72 performs logic operations on various subsets of these received 8 condition values. For example, it may generate a condition code representing the result of logically ORing 4 of the 8 condition values (corresponding to the four upper order elements of the vectors) and another condition code representing the result of logically ORing the other 4 of the 8 condition values (corresponding to the four lower order elements of the vectors). In parallel to these conditions, condition generating circuitry 72 may also perform other logic operations such as generating any number of condition codes representing a logical ORing of 2 of the 8 condition values. Therefore, any type of predetermined logic functions (such as OR, AND, NOT, etc., or combinations thereof) may be performed on subsets of condition values to generate any number of condition codes. In one embodiment, a subset of the condition values can include one or more condition values. More examples will be described with respect to FIGS. 4 and 5.

The condition codes generated by condition generating circuitry 72 are then stored in condition register 74. The number of condition codes generated (i.e. the number of subsets of condition values which can be used to generate condition codes) may be limited by the available number of fields in condition register 74. For example, if only 4 fields are available, then only 4 different subsets of the condition values can be used where each condition code generated by the logic operation performed on each of these subsets is stored in a corresponding one of the four fields. Note that the logic operation performed can include one or more logic operations. Also, condition register 74 may include one or more registers, may be located elsewhere within processor 14, and may be stored in other storage circuitry other than a register.

Note that in one embodiment, condition generating circuitry 72 may also be referred to as condition generation circuitry. Also, note that condition generating circuitry 72 and compare circuitry 70 may each be referred to as control circuitry or may collectively be referred to as control circuitry.

Operation of processor 14 is generally understood by one of ordinary skill in the art. Therefore, processor 14 will not be described in more detail herein except for those portions that are needed in understanding the various embodiments described in reference to FIGS. 2-5. Also note that existing designs for data processing systems having operands stored in a general purpose register file can be modified as needed to execute the instructions described here. Note that the embodiments described herein are described in reference to scalar register files, but any type of register file may be used and is not limited to only scalar register files.

Figures 2, 3, 4:
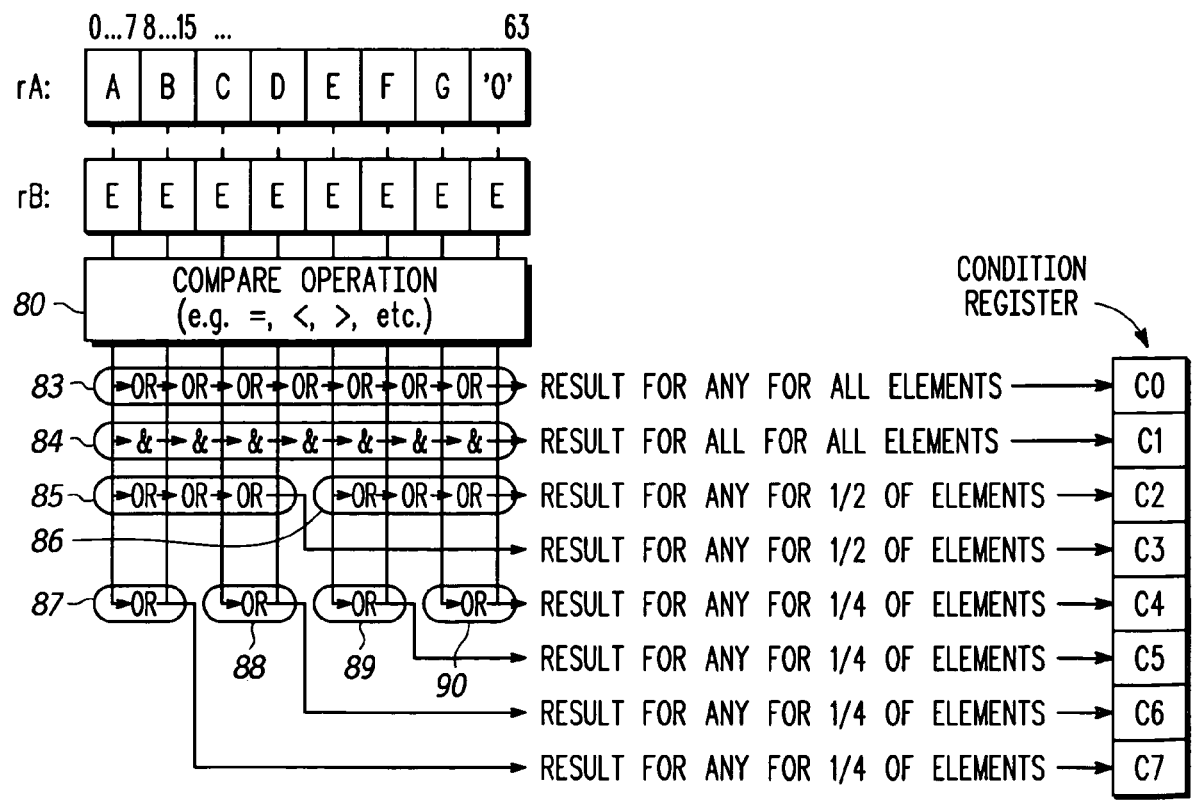
FIGS. 2-3 illustrate SIMD instructions with parallel condition code generation that may be executed by the data processing system of FIG. 1, in accordance with embodiments of the present invention.
FIGS. 4 and 5 illustrate examples of parallel condition code generation, in accordance with embodiments of the present invention.

FIGS. 2 and 3 illustrate vector compare instructions (also referred to as data processing instructions or processor instructions) that may be executed by processing circuitry, such as, for example, by processor 14 of FIG. 1. For example, each instruction can be fetched by instruction unit 30 which provides them, as appropriate, to control unit 28. Control unit 28 can therefore direct load/store unit 38 and execution units 32, as needed, to execute the received instructions, using register file 34 as needed to store data, as will be described in more detail below. Note that as used herein, a vector element refers to an element that can be at most the size of a GPR, but can also be less than the size of a GPR. For example, in the case where register file 34 includes 64-bit registers (M=64), a vector element can be of size 64 bits or less. For example, a vector element may be a byte (8 bits) such that one 64-bit GPR can hold 8 vector elements. Also, a vector element may be a halfword (16 bits) such that one 64-bit GPR can hold 4 vector elements. Similarly, a vector element may be a word (32 bits) such that one 64-bit GPR can hold 2 elements. In one form, each register can be described as including one or more fields for storing data, each of the one or more fields storing a vector element of the vector.

Note that as used herein, a byte is denoted by "b", a halfword by "h", and a word by "w". (Note that alternate embodiments, a word or halfword may be defined differently. For example, a word may refer to 16 bits rather than 32 bits. However, as will be used herein, a word refers to 32 bits, for ease of description.)

FIG. 2 illustrates a vector compare (vector_cmp) instruction which compares each vector element of one vector stored in a GPR with a corresponding vector element of another vector stored in another GPR. For example, if each GPR includes 8 vector elements, then the vector_cmp instruction performs 8 comparisons substantially in parallel. Execution of the vector_cmp instruction also updates the fields of condition register 74 substantially in parallel according to the logic functions and subset groupings implemented by condition generating circuitry 72. In one embodiment, additional control fields may be used to further define the operation, such as an any/all field, an s/u field, a cmp_type field, and an elem_size field, each illustrated in FIG. 2 as following the operator "vector_cmp", separated by periods. In one embodiment, each of these control fields is present; however, in alternate embodiments, some or none of these control fields may be present. In one embodiment, the any/all field indicates whether an AND logical function or OR logical function is performed on subsets of the condition values generated by the comparisons. In one embodiment, the s/u field indicates whether the vector elements are signed or unsigned values. In one embodiment, the cmp_type field indicates what type of compare or relational operation is done between vector elements. For example, it may indicate one of equal to, greater than, or less than. In one embodiment, the elem_size field indicates a size of each vector element. For example, in one embodiment, the elem_size field may be set to one of b, h, or w to indicate whether the vector elements are bytes, halfwords, or words, respectively. Also, in one embodiment, additional control fields may be included as needed, as indicated by the "other(s)" control field (which may or may not be present).

The vector_cmp instruction of FIG. 2 also includes two operands: rA and rB, where each of rA and rB indicate one of the GPRs of register file 34. The vector_cmp instruction performs a comparison of cmp_type between each vector element of rA and a corresponding element of rB (i.e. between data in each field of vector rA and data in a corresponding field of vector rB). For example, if cmp_type is set to indicate equal to, then the vector_cmp instruction compares each vector element of rA with a corresponding element of rB to determine if they are equal to each other. Also, the elem_size field determines how many compares are performed by the vector_cmp instruction since the elem_size determines the number of vector elements in each of rA and Rb. If elem_size indicates a byte (and assuming that each GPR is 64 bits), then each vector includes 8 vector elements, meaning 8 comparisons are performed. If elem_size indicates a word, then each vector includes only 4 elements, meaning 4 comparisons are performed.

FIG. 3 illustrates a vector compare and set instruction in accordance with one embodiment of the present invention. The vector compare and set instruction, vector_cmp_set, illustrated in FIG. 3 includes the same control fields as was described with respect to the vector compare instruction of FIG. 2. The vector_cmp_set instruction is analogous to the vector_cmp instruction except for the addition of a destination register, rD, which indicates another GPR of register file 34 to store a result of the instruction. Therefore, all the descriptions provided above with respect to the vector_cmp instruction also apply to the vector_cmp_set instruction. The destination register, rD, of the vector_cmp_set instruction stores a result of the compare (where the compare operation is provided by cmp_type). For example, in one embodiment, if the compare result is true, then each bit of a vector element of rD (corresponding to the vector elements of rA and rB that were compared) is set to a predetermined value, such as a logic level 1. Similarly, if the compare result is false, then each bit of the corresponding vector element is set to a second predetermined value, such as a logic level 0. Alternatively, other methods may be used to set a result in rD. Since vector_cmp and vector_cmp_set are analogous except for rD, the examples of FIGS. 4 and 5 will simply be described in reference to vector_cmp of FIG. 2.

In an alternate embodiment, the vector compare instructions (such as those of FIGS. 2 and 3) may also include at least one bit or field which indicates whether or not the condition register, such as condition register 74, should be updated in response to the instruction. That is, there may be situations where it may not be desirable to update condition register 74 in response to a particular instance of a vector compare instruction. This bit or field could appear, for example, in the "other(s)" control field illustrated in FIGS. 2 and 3 in order to allow for selective storing into condition register 74.

FIG. 4 illustrates an example of a vector compare that can be implemented with the vector_cmp instruction. In the illustrated example, each of rA and rB are 64 bit registers storing 8 8-bit vector elements. In the illustrated embodiment, the GPR indicated by rA stores a string of 8 elements: A, B, C, D, E, F, G, and '0' (where '0' represents a null character). The GPR indicated by rB stores a string of 8 elements: E, E, E, E, E, E, E, and E. Block 80 represents the compare operation indicated by cmp_type and thus provides the condition values (8 condition values in the embodiment illustrated in FIG. 4). For example, block 80 may perform a comparison to determine if the vector elements of rA are equal to, greater than, or less than the corresponding vector elements of rB. Therefore, note that the vector element ('A') stored in rA[0-7] is compared to the vector element ('E') stored in rB[0-7], the vector element ('B') stored in rA[8-15] is compared to the vector element ('E') stored in rB[8-15], etc., and condition values (representative of the result of the comparisons) are generated accordingly. Therefore, block 80 performs one comparison for each vector element for a total of 8 comparisons, thus producing 8 condition values. These comparisons can be preformed by, for example, by compare circuitry 70, and each of the 8 comparisons may be performed substantially in parallel.

Groupings 83-90 represent different groupings of condition values which may be used to generate a corresponding condition code to be stored in the condition register. In the illustrated embodiment, the condition register (which may be, for example, condition register 74) includes 8 fields, c0-c7, where each field corresponds to one of groupings of condition values 83-90. Also, any type of logic operation may be performed to determine relational information of the grouping. For example, group 83 represents an ORing of each condition value provided as a result of the 8 comparisons. Therefore, in the illustrated example, c0 would be set to indicate whether or not the condition values (i.e. the results of the vector element comparisons) is true for any of the 8 comparisons performed. Group 84 represents an ANDing of each condition value provided as a result of the 8 comparisons. Therefore, c1 would be set to indicate whether or not the result of the vector element comparisons is true for all of the 8 comparisons performed. (Note that in FIGS. 4 and 5, logical ANDing is illustrated using the "&" symbol.)

Note that in the example vector_cmp instruction of FIG. 2, the any/all control field indicates whether and AND function or an OR function is performed per grouping. In one embodiment, if the any/all field is not present, then the instruction results in both an ORing and an ANDing of the condition values. In an alternate embodiment, the any/all field may not be used at all. That is, other methods may be used to indicate what logical function is to be performed on a particular group of condition values, examples of which will be discussed further below.

Each of groupings 85 and 86 and corresponding condition code fields c3 and c2, respectively, provide relational information with respect to half of the condition values generated by the 8 comparisons. For example, c3, corresponding to grouping 85, indicates whether or not the comparison result is true for any of the upper half of vector elements (stored in bits 0-31 of registers rA and rB), while c2, corresponding to grouping 86, indicates whether or not the comparison result is true for any of the lower half of vector elements (stored in bits 32-63 of registers rA and rB). Note that each of groupings 85 and 86 represent a logical ORing of the condition values generated by the comparisons of each respective half of the vectors; however, in alternate embodiments, groupings 85 and 86 could represent a logical ANDing of the condition values where c3 and c2 would then indicate whether or not the comparison is true for all of the elements in each respective half of the vector elements. Alternatively, additional groupings could be implemented corresponding to two additional fields of the condition register to represent the logical ANDings.

Each of groupings 87-88 and corresponding condition code fields c7, c6, c5, and c4, respectively, provide relational information with respect to a fourth of the condition values generated by the 8 comparisons. For example, c7, corresponding to grouping 87, indicates whether or not the comparison result is true for any of the upper fourth of vector elements (stored in bits 0-15 of registers rA and rB); c6, corresponding to grouping 88, indicates whether or not the comparison result is true for any of the next fourth of vector elements (stored in bits 16-31 of registers rA and rB); c5, corresponding to grouping 89, indicates whether or not the comparison result is true for any of the next fourth of vector elements (stored in bits 32-47 of registers rA and rB); and c4, corresponding to grouping 90, indicates whether or not the comparison result is true for any of the lower fourth of vector elements (stored in bits 48-63 of registers rA and rB). Again, as with groupings 85 and 86, and ORing function of the condition values is performed to generate the condition codes.

Therefore, note that each of the condition codes in the condition register (c0-c7 in the illustrated embodiment) are determined substantially in parallel where condition generating circuitry 72 determines the value of each of the condition codes based on the condition values (i.e. compare results) from compare circuitry 70 and updates condition register 74 accordingly. That is, in response to execution of a single vector compare instruction, multiple fields of the condition register (such as c0-17) can be updated substantially in parallel. Therefore, fewer fields in the condition register would allow for fewer groupings while a larger number of fields in the condition register would allow for a greater number of groupings to be set up. Also, for each grouping, the appropriate circuitry is located within condition generating circuitry 72 for performing the desired logical operation on the groupings. Also, note that condition register can be implemented using any type of storage circuitry and is not limited to a register. Furthermore, any number of registers and fields within the register or registers can be used, depending on the desired configuration.

The parallel updating of condition register 74 in response to a single instruction may allow, for example, for more efficient software for performing searches or for pruning of elements. For example, the groupings illustrated in the example of FIG. 4 allow for software to more efficiently perform a binary search. In a binary search of a vector, it is determined whether a searched element is located in a first half or a second half of the vector. In whichever half it is, then that half is divided into two halves and it is determined in which of those halves (each being a fourth of the original vector) the vector element is located in, and then that half gets again divided into two halves (corresponding to an eighth of the original vector). This continues until the element is found. This allows for a search to be performed using less comparisons than having to go through each element of the vectors to determine if there's a match. Therefore, the binary groupings illustrated in FIG. 4, in combination with the ORing function performed on each of the groupings 83-90, allow for a faster binary search.

For example, in FIG. 4, the vector stored at rB can be compared to the vector stored in rA to determine the location of element 'E' in the vector stored in rA. In this example, the cmp_type of the vector compare instruction would be set to equal to. Therefore, compare operation 80 would providing a true value for each condition value in which the elements were equal and a false value otherwise. In the illustrated example, only the fifth comparison (of the fifth vector elements, stored in rA[32-39] and rB[32-39]) would provide a true result since both the fifth vector elements are 'E'. The result for grouping 83 would therefore result in a true since at least one condition value (i.e. compare result) from compare operation 80 is true, and c0 would be updated accordingly. For example, assuming that a logic level "1" indicates true and a logic level "0" indicates false, c0 would be updated with a logic level "1". (Note that in an alternate embodiment, a logic level "1" may indicate false and a logic level "0" may indicate true.) The result for grouping 84 would be false since the result is not true for all elements of the vectors. That is, the vectors in rA and rB are not equal. The result for grouping 85 would be false since none of the first half of vector elements of rA match any of the first half of vector elements of rB. However, the result for grouping 86 would be true since at least one of the vector elements in that grouping matches (the two 'E's). Similarly, results for groupings 87, 88, and 90 would each be false, while the result for grouping 89 would be true, since one of the comparisons within that grouping matches (again, the two 'E's). Therefore, the values of the resulting condition register for c0-c7 would be 1, 0, 1, 0, 0, 1, 0, 0, respectively. These values, which are all generated substantially in parallel by groupings 93-90 in response to execution of a single instruction which performs 8 comparisons, can be used by the software to efficiently perform a quick search. Note that in this example, each of the groupings is implemented as a binary grouping of the condition values (representing the 8 comparison results) where the number of condition values used in each of the binary groupings is divisible by two.

For example, software can first test bits c3 and c2 to determine whether a match occurred in the upper half or lower half of the vectors. In the illustrated embodiment, c2 would indicate a match occurred since the matching 'E's are in the lower half of the vector. The software can then proceed to test bits c4 and c5 (which were generated in parallel to bits c3 and c2 in response to the single vector compare instruction) to determine in which half of the lower half (i.e. in which fourth of the original 8-element vectors) the match occurs. In the illustrated embodiment, c5 would indicate a match occurred since the matching 'E's are in the upper half of the lower half of the original 8-element vector. At this point the software can simply perform a single comparison of elements 5 or 6 of the vectors to determine if the fifth or sixth elements of the vector matched. Therefore, through the use of the condition codes generated in parallel and stored in the condition register, a binary search can be efficiently implemented by software to search for a matching element.

Note that in this example, if neither bits c3 nor c2 indicated a match, then it would indicate that none of the elements of the two vectors matched, in which case the search would end at that point. Alternatively, bit c0 (the result of grouping 83) can be initially tested to determined whether a match even exists before attempting to find which element or elements match. If bit c0 is tested first to determine that there is at least one match within the vectors, and it is expected that only a single element should match, the software can be written such that only one of bits c2 and c3 is tested. For example, if only bit c2 is tested, which would result in false in the current example, it is known that the match must exist in the lower half (corresponding to bit c3). Similarly, once it is known that the match exists in the lower half, only one of bits c4 and c5 needs to be tested, etc. Also, bit c1 (the result of grouping 84) can also be initially tested to determine whether all elements match, in which case the search would end. These are only a few examples of how to use the condition codes generated by the compare instruction to allow for improved software. That is, software can be written in many different ways to take advantage of any or all of the bits in condition register 74 to more quickly perform searching or other types of functions and operations, as will be appreciated by those skilled in the art.

Figure 5:
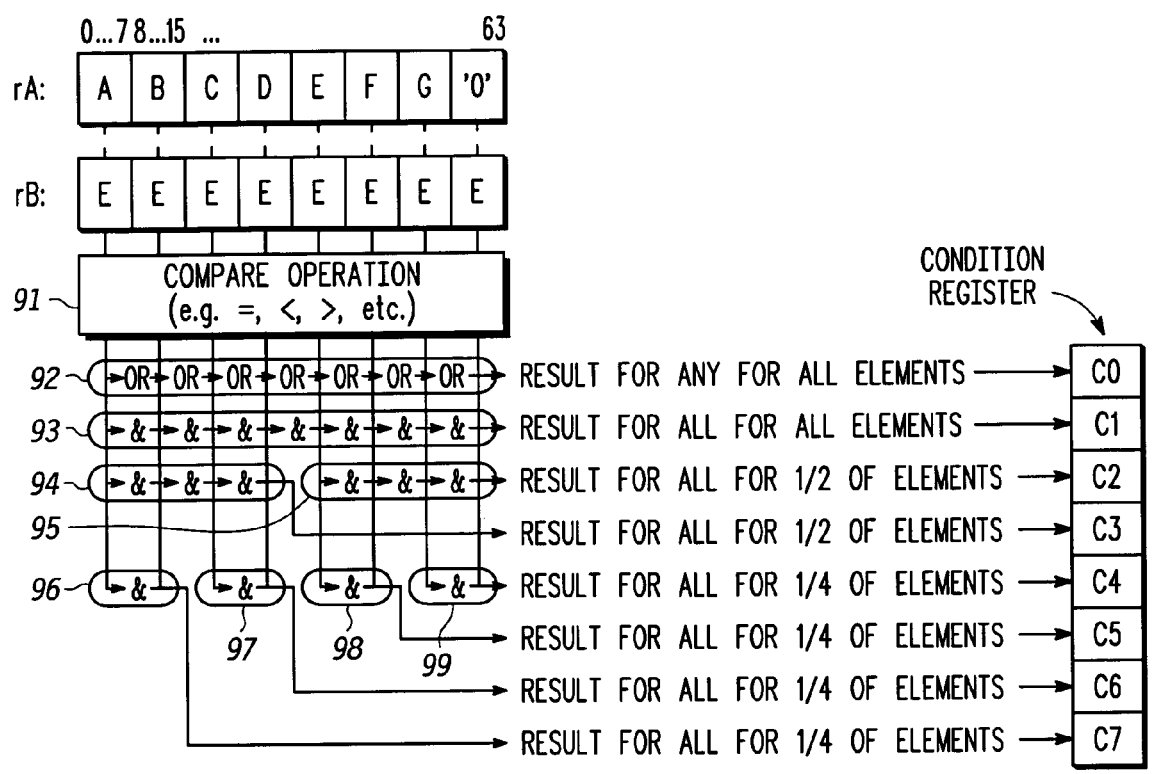

FIG. 5 illustrates an another embodiment which is similar to that of FIG. 4, except that and ANDing of the compare results is performed for each of groupings 93-99 is performed rather than an ORing. Therefore, in this case, note that the values of the resulting condition register for c0-c7 would be 1, 0, 0, 0, 0, 0, 0, 0, respectively.

As stated above, the available groupings (such as groupings 83-87 and groupings 92-99) depend on the implementation of condition generating circuitry 72 and condition register 74. That is, the groupings of FIGS. 4 and 5 simply provide some examples, but different designs may implement more groupings, fewer groupings, or different combination of groupings with any type of logic function preformed in the groupings to generate the corresponding condition codes to be stored in condition register 74.

Also, note that vector compare instructions can have many different formats. For example, different instructions can be used which result in different groupings of condition values. For example, one vector compare instruction can implement the groupings of FIG. 4 while another vector compare instruction can implement the groupings of FIG. 5. Alternatively, a same instruction with different control fields can be used where the control fields define the type of groupings, the different logical functions performed on the groupings, etc, or combinations thereof. For example, in the example of FIGS. 2 and 3, a control field was used to designate all or any, indicating an AND or OR function. Alternatively, separate instruction may be used for any and for all, rather than designating any or all in a control field. Furthermore, in one embodiment, separate instructions may be used to represent various different combinations of the possible control field values.

In the foregoing specification, the invention has been described with reference to specific embodiments. However, one of ordinary skill in the art appreciates that various modifications and changes can be made without departing from the scope of the present invention as set forth in the claims below. For example, any software taught herein may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may include different blocks than those illustrated and may have more or less blocks or be arranged differently. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A processing system for performing data processing operations in response to a single-instruction multiple data (SIMD) data processing instruction, comprising:

at least two registers, each of the at least two registers storing a vector having at least three fields, each field for storing a multiple-bit vector element;

first control circuitry, the first control circuitry, in response to the SIMD data processing instruction, comparing multiple-bit vector elements in respective corresponding fields of the at least two registers to create a plurality of condition values, the plurality of condition values comprising at least three condition values;

second control circuitry for receiving the plurality of condition values and performing one or more predetermined logic operations on one or more subsets of the plurality of condition values, wherein each of the one or more subsets includes less than all of the plurality of condition values and more than one condition value of the plurality of condition values, to generate a condition code for each of the one or more subsets; and a condition code register for storing the condition code for each of the one or more subsets.

2. The processing system of claim 1 wherein the condition code register comprises a storage location corresponding to each of the one or more subsets.

3. The processing system of claim 1 wherein the condition code for each of the one or more subsets is selectively stored in the condition code register based on at least one bit in the single data processing instruction.

4. The processing system of claim 1 wherein each of the one or more subsets includes a number of condition values that is divisible by two and wherein the one or more predetermined logic operations on the one or more subsets are performed substantially in parallel.

5. The processing system of claim 1 wherein the comparing of multiple-bit vector elements performed by the first control circuitry is a determination whether a multiple-bit vector element in each field of a first register is equal to a multiple-bit vector element in a corresponding field of a second register.

6. The processing system of claim 1 wherein the comparing of multiple-bit vector elements performed by the first control circuitry is a determination whether an unsigned multiple-bit vector element in each field of a first register is less than an unsigned multiple-bit vector element in a corresponding field of a second register.

7. The processing system of claim 1 wherein the comparing of multiple-bit vector elements performed by the first control circuitry is a determination whether a signed in each field of a first register is less than a signed multiple-bit vector element in a corresponding field of a second register.

8. A method, comprising:
providing a processor for performing data processing operations in response to a single-instruction multiple data (SIMD) instruction;
providing at least two registers, each of the at least two registers storing a vector having at least three fields, each field for storing a multiple-bit vector element;
in response to the SIMD instruction, comparing multiple-bit vector elements in a plurality of respective corresponding fields of the at least two registers to create a plurality of condition values, wherein the plurality of condition values comprises at least three condition values;
receiving the plurality of condition values and performing one or more predetermined logic operations on one or more subsets of the plurality of condition values, each of the one or more subsets including less than all of the plurality of condition values and more than one condition value, to generate a condition code for each of the one or more subsets; and
storing the condition code for each of the one or more subsets in response to at least one bit in a single data processing instruction executed by the processor.

9. The method of claim 8 further comprising:
performing the one or more predetermined logic operations on the one or more subsets of the plurality of condition values substantially in parallel.

10. The method of claim 9, wherein each of the one or more subsets includes a number of condition values that is divisible by two.

11. The method of claim 8 further comprising:
comparing multiple-bit vector elements in the plurality of respective corresponding fields of the at least two registers by determining whether a multiple-bit vector element in each field of a first of the at least two registers equals a multiple-bit vector element in a corresponding field of a second of the at least two registers.

12. The method of claim 8 further comprising:
comparing multiple-bit vector elements in the plurality of respective corresponding fields of the at least two registers by determining whether an unsigned multiple-bit vector element in each field of a first of the at least two registers is less than an unsigned multiple-bit vector element in a corresponding field of a second of the at least two registers.

13. The method of claim 8 further comprising:
comparing multiple-bit vector element in the plurality of respective corresponding fields of the at least two registers by determining whether a signed multiple-bit vector element in each field of a first of the at least two registers is less than a signed multiple-bit vector element in a corresponding field of a second of the at least two registers.

14. The method of claim 8 further comprising storing the plurality of condition values in a third register.

15. A processing system for performing data processing operations in response to a single-instruction multiple data (SIMD) data processing instruction, comprising:
a first register for storing a vector having a plurality of fields, each field for storing a multiple-bit vector element;
a second register for storing a vector having a plurality of fields, each field for storing a multiple-bit vector element;
compare circuitry coupled to the first register and the second register, the compare circuitry, in response to the SIMD data processing instruction, making a predetermined comparison between multiple-bit vector elements of respective corresponding fields to create a set of condition values;
condition generation circuitry coupled to the compare circuitry for binarily grouping the set of condition values into predetermined groups, wherein each predetermined group has a number of condition values, wherein the number of condition values in each predetermined group is less than a count of all condition values of the set of condition values and more than one, and wherein each number of condition values is divisible by two, the condition generation circuitry applying one or more predetermined logic operations substantially concurrently to each condition value of the predetermined groups to generate a condition code corresponding to each of the predetermined groups; and
a condition code register coupled to the condition generation circuitry for storing the condition codes.

16. The processing system of claim 15 wherein the condition code register comprises a storage location corresponding to each of the predetermined groups.

17. The processing system of claim 15 wherein the compare circuitry determines whether a multiple-bit vector element in each field of the first register is equal to a multiple-bit vector element in a corresponding field of the second register.

18. The processing system of claim 15 wherein the compare circuitry determines whether an unsigned multiple-bit vector element in each field of the first register is less than an unsigned multiple-bit vector element in a corresponding field of the second register.

19. The processing system of claim 15 wherein the compare circuitry determines whether a signed multiple-bit vector element in each field of the first register is greater than a signed multiple-bit vector element in a corresponding field of the second register.

20. The processing system of claim 15 wherein the condition generation circuitry binarily groups the set of condition values into predetermined groups by having a first group and a second group with all of the condition values, a third and a fourth group each with half of the condition values, and a fifth, sixth, seventh and eighth group each with one-fourth of the condition values and eight logic operation results are provided to the condition code register.

* * * * *